June 9, 1953  J. J. GILVARRY ET AL  2,641,458
ACCELEROMETER
Filed March 5, 1949
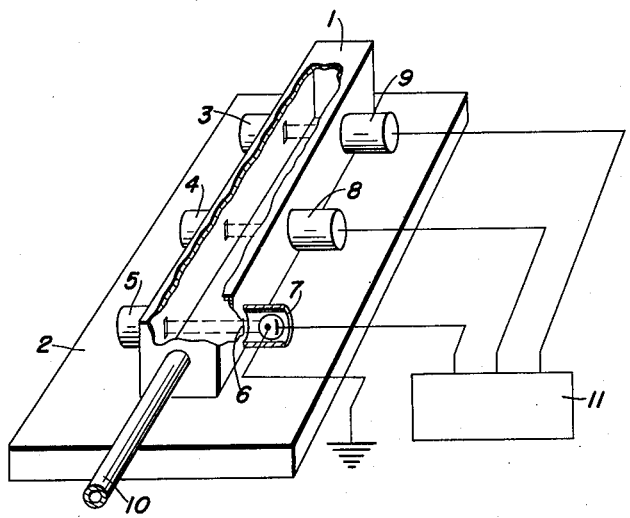
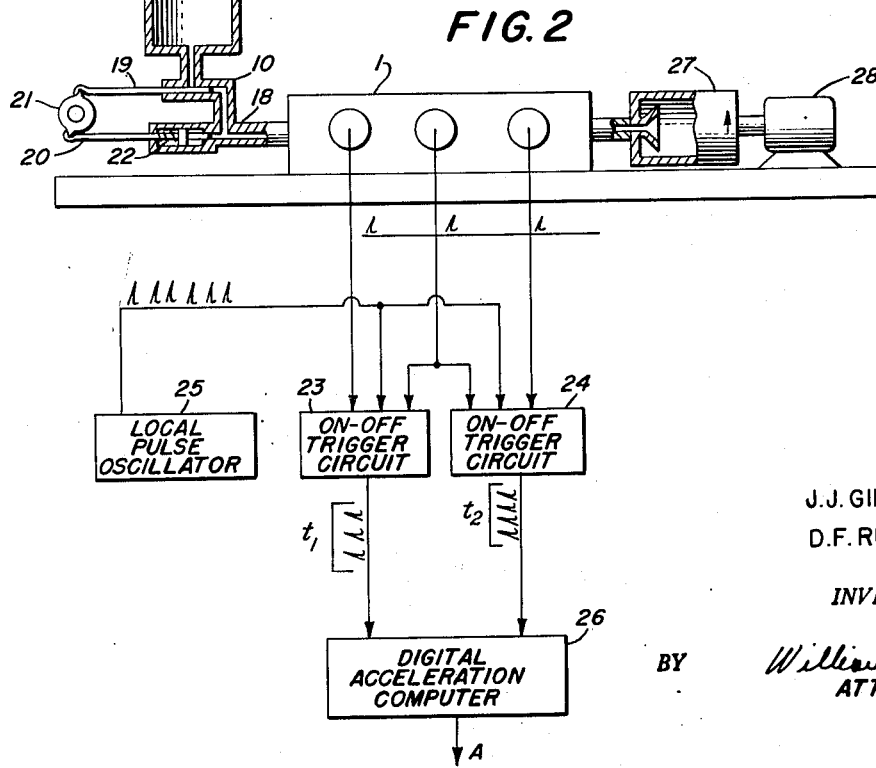
J.J. GILVARRY
D.F. RUTLAND
INVENTORS
BY William P. Lane
ATTORNEY Patented June 9, 1953

2,641,458

UNITED STATES PATENT OFFICE 2,641,458

ACCELEROMETER

John J. Gilvarry, Santa Monica, and David F. Rutland, Pacific Palisades, Calif., assignors to North American Aviation, Inc.

Application March 5, 1949, Serial No. 79,768

5 Claims. (Cl. 264—1)

This invention relates to the measurement of acceleration and particularly to the measurement of the acceleration of a body in space by the variation in relative velocity of accelerated and unaccelerated masses in space.

An object of this invention is to provide a method and means for the measurement of acceleration which is virtually independent of friction and hysteresis, has no associated natural frequency, and which is capable of measuring a wide range of accelerations with precision.

It is a further object of the invention to provide an acceleration measuring device which yields an output signal in digital form.

A further object of this invention is to provide a means for measuring accelerations dependent on the apparent change in velocity of objects in free flight within an enclosure subject to accelerations.

Other objects of invention will be apparent from the following description taken in conjunction with the accompanying drawing in which Fig. 1 is a partial schematic view of the device; and Fig. 2 is a schematic view of the arrangement shown in Fig. 1.

In Fig. 1 is shown an evacuable container 1 mounted on a base 2. Container 1 carries light sources 3, 4, and 5, mounted on one side thereof with apertures for admitting light into the container 1. Oppositely mounted on container 1 are light detecting means 7, 8, and 9, such as photocells, capable of detecting light in container 1 through small apertures 6 in container 1. Mounted on the longitudinal axis of container 1 is projectile emitter 10 operatively positioned to emit particles of matter along the longitudinal axis of the container. Projectile emitter 10 is a compressed air gun, spring gun, water spray nozzle, or any other similar device capable of ejecting uniform particles at a substantially uniform velocity. Operatively associated with light detecting means 7, 8, and 9 is an electronic timing means 11.

In using this device to measure accelerations of container 1 and associated apparatus, particles of matter are emitted chronologically along the longitudinal axis of the container. As each particle crosses a transverse plane formed by light source 5 and light detecting means 7, it interrupts the beam of light received by light detecting means 7 from light source 5. This interruption causes the generation of an electrical signal which is fed to electronic timer 11. When the emitted particle reaches positions in the container opposite light detecting means 8 and 9, similar signals are generated in a like manner. Thus an accurate means is provided for detecting the presence of the particles at three different points in their path through the container. Furthermore, since each of the light detecting means sends a signal to electronic timer 11 whenever a particle passes it, the electronic timer can be arranged to read both the time of transit of particles over each segment of its path, and the difference between the transit times over each of the two segments of the path.

When the device is at rest or moving through space with a uniform velocity, the time elapsed between the signals successively generated by detecting means 7, 8, and 9, are equal. However, if the device is given an acceleration along the longitudinal axis of container 1, the time elapsed between the successive signals from the detecting means is no longer equal. This phenomenon is due to the fact that the particles which are in free flight experience no acceleration. Hence, their apparent time of flight through the accelerated container is either longer or shorter than the time observed when the container is not accelerated depending on the direction of acceleration. It has been established theoretically that a definite mathematical relationship exists between the acceleration applied and the time elapsed between the successive signals. Or, in other words, the measured elapsed times are an indirect measure of the acceleration applied to the device. The exact relationship is given by the formula $$A = 2\left[\frac{l_2 t_2 - l_1 t_1}{t_1 t_2 (t_1 + t_2)}\right]$$

where $A$ is the acceleration measured, $l_1$ is the distance between the first and second slit, $l_2$ is the distance between the second and third slit, $t_1$ is the time required for a particle to traverse the distance between the first and second slits and $t_2$ is the time required for the same particle to traverse the distance between the second and last slits. Figure 2 shows in detail how the acceleration of container 1 is obtained by use of information gained by detecting means 7, 8, and 9. Projectile emitter 10 is shown in detail in Fig. 2 as a spring operated gun, although it is to be understood any other suitable means such as a compressed air gun could be used. In Fig. 2 accurately machined steel balls (one millimeter in diameter as an example) are dropped consecutively one at a time from hopper 17 into barrel 18 by action of shutter 19 and plunger 20 coordinated by cam 21. Spring 22, being loaded by cam-actuated movement of plunger 20 propels the balls one by one across container 1. As each ball interrupts the light received by detectors 7, 8, and 9, a signal is generated which is fed to On-Off trigger circuits (shown and described in detail in volume 19 of the Massachusetts Institute of Technology Radiation Laboratory Series entitled "Waveforms," by Chance, Hughes, MacNichol, Sayre, and Williams, sec. 5.12, page 187 et seq.) 23 and 24 the function of which is to connect the output of high frequency local oscillator 25 to digital computer 26 for a length of time equal to $t_1$ and for a length of time equal to $t_2$. Digital computer 26 then uses these quantities to compute the aforesaid equation yielding the acceleration of container 1 in digital form. A preeminent advantage gained by this device is that the acceleration measured is presented in digital form, which facilitates dealing with the information by means of digital computers.

After the balls have completed their flight through container 1 they are lodged in cylindrical catcher 27 rotated by motor 28 at such velocity as to cause the spent balls to cling to the surface of catcher 27 by centrifugal force.

Instead of steel balls, of course, it is possible to use many other types of particles, notably oil droplets of uniform size, by appropriate modification of projectile emitter 10.

Although the invention has been described and illustrated in detail, it is to be clearly understood that the same is by way of illustration and example only and is not to be taken by way of limitation, the spirit and scope of this invention being limited only by terms of the appended claims.

We claim:

1. Measuring means comprising a container subject to acceleration, means for projecting a plurality of small masses uniformly into said container in a predetermined direction, means for instantaneously sensing the presence of said masses at predetermined planes in the container, and means operably associated with said sensing means for measuring the time necessary for each of said masses to travel from one of said predetermined planes to another, to thereby obtain quantities of which the acceleration to which said container is subject in said predetermined direction is a function.

2. A measuring device comprising a container subject to accelerations, means for projecting into said container a plurality of small masses with a substantially uniform velocity along a path parallel to the direction in which said container is generally subject to acceleration, means for measuring the time necessary for said masses to traverse predetermined distances in said container to measure thereby a quantity of which the accelerations to which said container is subjected are a function.

3. A device as recited in claim 2 in which said means for measuring time comprises a plurality of light sources and light-detecting means positioned in complement at predetermined intervals adjacent to said path of said masses, means responsive to said light-detecting means for determining the time for passage of the shadow of said masses over said predetermined intervals, and means for comparing said determined time for each of said predetermined intervals to thereby obtain a measure of the acceleration to which said container is subjected.

4. A device as recited in claim 2 in which said means for measuring time comprises a plurality of sensing elements which are sensitive to the very near presence of said masses predeterminately spaced along said path of said masses, and means responsive to said sensing elements for electronically determining the time of passage of said masses over said predetermined spaces, to thereby obtain a measure of the acceleration to which said container is subject.

5. Measuring means comprising a container subject to accelerations; a plurality of small masses; means for projecting said masses in said container in at least one predetermined direction; means for instantaneously sensing the presence of said masses at predetermined points in said container, and means operably associated with said sensing means for measuring the time necessary for each of said masses to travel the distance between said predetermined points in said container, to thereby measure a quantity of which the accelerations to which said container is subject are a function.

JOHN J. GILVARRY.
DAVID F. RUTLAND.

References Cited in the file of this patent

UNITED STATES PATENTS

| Number | Name | Date |
|---|---|---|
| 2,294,730 | Eggers | Sept. 1, 1942 |
| 2,319,932 | Jacobs | May 25, 1943 |
| 2,355,128 | Whitlock | Aug. 8, 1944 |
| 2,457,620 | Abraham | Dec. 28, 1948 |

FOREIGN PATENTS

| Number | Country | Date |
|---|---|---|
| 541,132 | France | Apr. 27, 1922 |